United States Patent
Guthrie et al.

(10) Patent No.: US 8,839,591 B2
(45) Date of Patent: Sep. 23, 2014

(54) CONCRETE ANCHOR POINT SYSTEM

(75) Inventors: Karl Guthrie, Austin, TX (US); Ivan A. J. Kekahuna, Austin, TX (US); Eric Shawn Patrick, Austin, TX (US); Ben Sy, Austin, TX (US)

(73) Assignee: Climb Tech, LLC, Austin, TX (US)

( * ) Notice: Subject to any disclaimer, the term of this patent is extended or adjusted under 35 U.S.C. 154(b) by 0 days.

(21) Appl. No.: 13/471,171

(22) Filed: May 14, 2012

(65) Prior Publication Data
US 2013/0298493 A1    Nov. 14, 2013

(51) Int. Cl.
*F16B 13/04*    (2006.01)

(52) U.S. Cl.
USPC .............. 52/745.21; 248/231.91; 248/231.9; 403/367; 411/80; 411/60.1; 411/75; 254/134.3 FT; 254/134.3 R; 269/3; 269/6; 269/95; 81/484

(58) Field of Classification Search
CPC .......... E21B 19/16; F16B 13/06; F16B 13/04; F16B 21/00; A47B 96/06; A47F 5/08; E04B 1/38
USPC .......... 52/704, 707, 698, 125.3, 125.4, 125.5, 52/127.7, 127.12, 745.21; 411/80, 75, 411/60.1, 44, 15; 81/177.8, 53.1, 13, 55, 81/57.32, 98, 99, 57, 32, 484; 254/134.3 FT, 134 R; 269/6, 3, 95; 248/231.9, 231.91, 231.21, 925, 231.3, 248/323, 220.21; 403/365–368, 97
See application file for complete search history.

(56) References Cited

U.S. PATENT DOCUMENTS

| | | | |
|---|---|---|---|
| 1,469,666 A | | 10/1923 | Pleister et al. |
| 4,074,609 A | * | 2/1978 | Busler .............................. 411/45 |
| 4,715,568 A | * | 12/1987 | Best, Jr. ..................... 248/231.9 |
| 4,770,580 A | * | 9/1988 | Fishcher ......................... 411/45 |
| 4,773,803 A | * | 9/1988 | Huegel et al. .................... 411/55 |
| 4,818,163 A | * | 4/1989 | Bereiter et al. ................. 411/44 |
| 4,834,327 A | * | 5/1989 | Byrne ........................ 248/231.9 |
| 4,848,971 A | | 7/1989 | Price Jr. |
| 5,205,689 A | * | 4/1993 | Fischer .......................... 411/54 |
| 5,484,132 A | * | 1/1996 | George et al. ............. 248/231.9 |
| 5,564,852 A | * | 10/1996 | Maxwell et al. ................ 403/97 |
| 5,688,066 A | * | 11/1997 | Loose ........................... 403/297 |
| 5,742,220 A | * | 4/1998 | Scherer ........................ 337/171 |
| 6,283,426 B1 | * | 9/2001 | Guthrie et al. ............. 248/231.9 |
| 6,474,197 B1 | * | 11/2002 | Browen et al. ................... 81/3.8 |

(Continued)

FOREIGN PATENT DOCUMENTS

| | | |
|---|---|---|
| EP | 0 225 845 | 11/1986 |
| EP | 0 323 391 A | 7/1989 |
| GB | 2 157 355 A | 3/1985 |
| WO | WO 97/32631 | 3/1997 |

OTHER PUBLICATIONS

International Search Report and Written Opinion in International application No. PCT/US2013/040737.

*Primary Examiner* — Brian Glessner
*Assistant Examiner* — Beth Stephan
(74) *Attorney, Agent, or Firm* — Portland Intellectual Property, LLC

(57) ABSTRACT

A concrete anchor point system provides for an anchor point, a receptacle for embedding into a concrete structure for removably receiving the anchor point, and a tool for remotely installing the anchor point in the structure, or removing the anchor point from the structure. The receptacle is preferably tapered, and an anchoring end of the anchor point is preferably tapered to match.

21 Claims, 8 Drawing Sheets

(56) References Cited

U.S. PATENT DOCUMENTS

| | | | |
|---|---|---|---|
| 6,729,821 B2 * | 5/2004 | Guthrie et al. | 411/80 |
| 6,943,301 B2 * | 9/2005 | Lee | 174/138 R |
| 7,011,281 B2 * | 3/2006 | Guthrie et al. | 248/231.31 |
| 7,121,172 B1 * | 10/2006 | Daniels | 81/98 |
| 7,258,316 B2 * | 8/2007 | Reeves | 248/231.91 |
| 7,357,363 B2 * | 4/2008 | Guthrie et al. | 248/231.31 |
| 2009/0056267 A1 | 3/2009 | Reeves | |
| 2009/0274533 A1 * | 11/2009 | Zimmer et al. | 411/49 |

\* cited by examiner

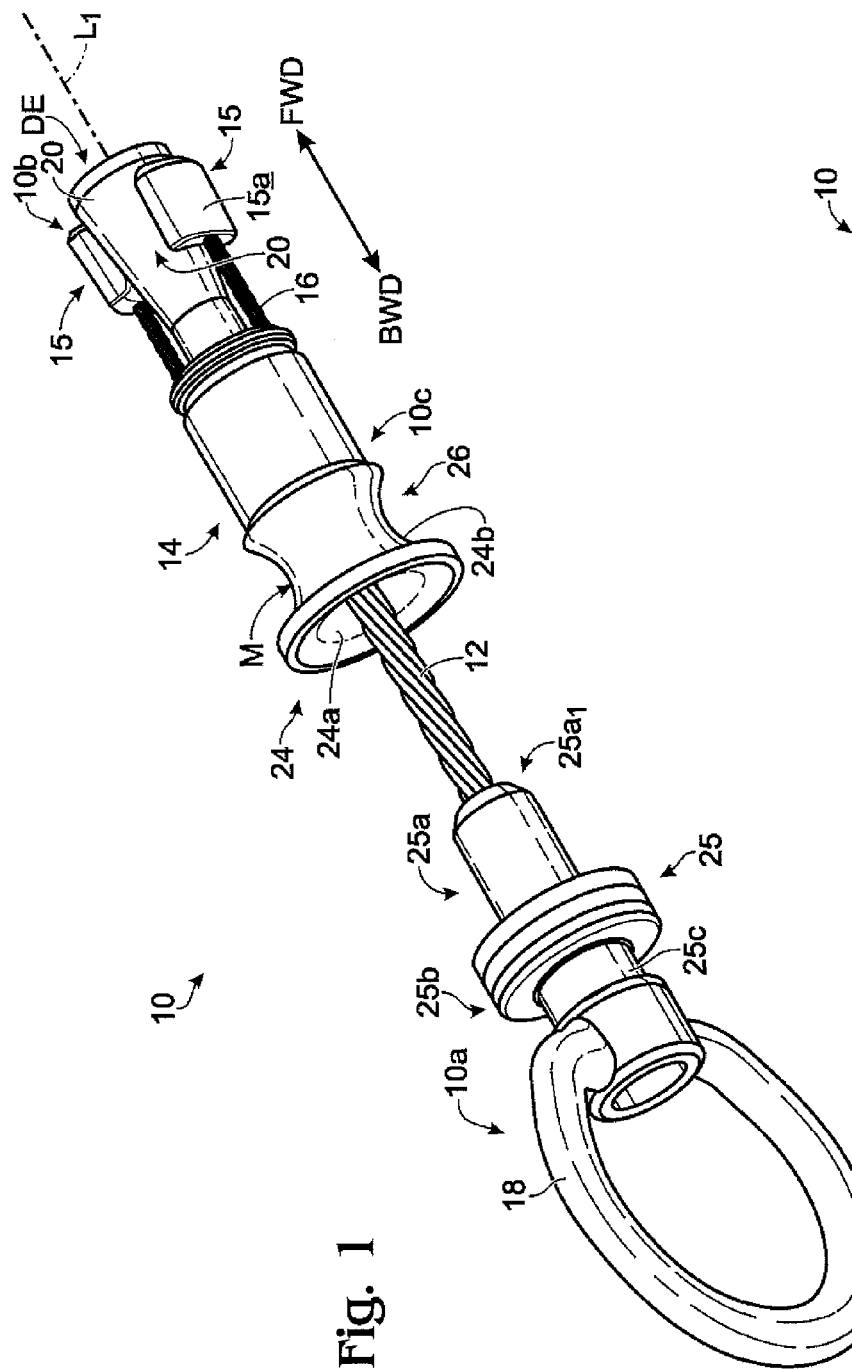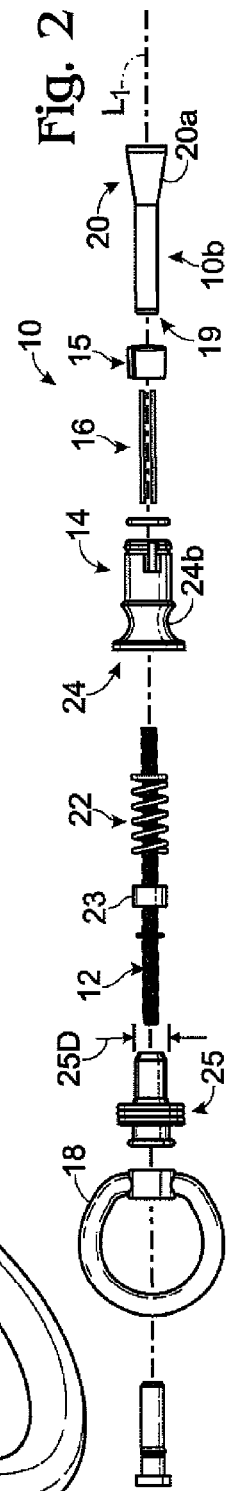

US 8,839,591 B2

CONCRETE ANCHOR POINT SYSTEM

FIELD OF THE INVENTION

The present invention relates to a concrete anchor point system, providing a movable anchor for removable attachment to an overhead concrete structure, to provide fall protection for a construction or maintenance worker.

BACKGROUND

Many large industrial and commercial buildings have overhead concrete ceilings. These are typically formed by pouring the concrete over a wood or metal "deck" constructed at the site. Typically, a false or decorative ceiling is hung from the concrete ceiling, as are utility structures such as air ducts, plumbing, mechanical piping, mechanical equipment, electrical conduit, and cable trays. To attach suspended structures to concrete ceilings, threaded inserts are provided in the deck, with the concrete being poured over the inserts. After the concrete is set, threaded rods may be threaded into the inserts, and the free ends of the threaded rods used to attach the structures. Typical example of such inserts are described in U.S. Pat. Nos. 7,093,400 and 6,240,697, which in one popular commercial form is marketed as the BLUE BANGER HANGER®, by Tomarco Contractor Specialties Inc., of La Mirada, Calif.

There is also a recognized need to tether construction workers to the structure being constructed, to protect the worker from injury or death resulting from falls. Typically, the worker wears a harness, and the harness is removably connected or attached to a lanyard. The lanyard is a flexible tensile member such as a rope or cable that has attachment hardware, typically a carabiner, at each end. One end of the lanyard is coupled to an "anchor point" provided on the structure, and the other end of the lanyard is coupled to the harness.

SUMMARY

Disclosed is a concrete anchor point system.

An anchor point for use in the system includes an anchoring portion supporting a first chock, a locking/unlocking portion supporting at least one second chock; and an elongate primary support member defining a longitudinal axis. The primary support member supports the anchoring portion and the locking/unlocking portion so that the locking/unlocking portion is allowed, and also constrained, to move relative to the anchoring portion along the longitudinal axis in forward and backward directions. In all embodiments, the primary support member is preferably flexible.

The first chock has a radially outer-most surface at least 50%, and preferably at least 80%, of which is tapered to progressively increase in lateral extent in the forward direction.

The relationship between the first and second chocks is such that moving the locking/unlocking portion in the forward direction relative to the first chock results in the second chock being forced radially outwardly by the first chock to define, at an anchoring end of the anchoring portion, a wedging configuration of the anchor point. Also, moving the locking/unlocking portion in the backward direction relative to the first chock results in the second chock being allowed to move radially inwardly and thereby to define, at the anchoring end of the anchoring portion, a narrowed configuration of the anchor point.

The second chock has a radially outer-most surface at least 50% of which, and preferably at least 80% of which, when the second chock is seated against said the chock, progressively increases in lateral extent in the forward direction.

Preferably, the anchor point includes a cleaning bushing supported by the primary support member so that the cleaning bushing is allowed, and also constrained, to move relative to the anchoring portion along the longitudinal axis in forward and backward directions independent of the locking/unlocking portion, and so that the cleaning bushing is allowed to come into or out of abutting relationship with the anchoring portion over a range of relative movements of the locking/unlocking portion and the anchoring portion.

Preferably, whether or not the anchor point includes a cleaning bushing, when the second chock is seated against the first chock the at least 50% of the radially outer-most surface of the second chock linearly progressively increases in lateral extent in the forward direction so as to define a constant taper relative to the longitudinal axis.

The anchor point is provided for use in a structure having a hole, and preferably the hole defines a constant taper over a depth thereof that is at least the length of the second chock measured in the direction of the longitudinal axis. Preferably, when the second chock is seated against the first chock, the taper of the at least 50% of the radially outer-most surface of the second chock substantially matches the taper of the hole.

Preferably, in all embodiments of the anchor point, there are at least two instances of the second chock symmetrically disposed about the longitudinal axis.

Preferably, in all embodiments of the anchor point, the at least 50% of the radially outer-most surface of the first chock is tapered relative to the longitudinal axis at a first rate, and when the second chock is seated against the first chock, the at least 50% of the radially outer-most surface of the second chock is tapered relative to the axis at a second rate, and the first rate is greater than the second rate.

Preferably, in all embodiments of the anchor point, the first rate is substantially constant over a distance measured in the direction of the longitudinal axis that is at least 50% of the length of the first chock measured in the direction of the longitudinal axis, and the second rate is substantially constant over a distance measured in the direction of the longitudinal axis that is at least 50% of the length of the second chock measured in the direction of the longitudinal axis.

Preferably, in all embodiments of the anchor point, the first rate is in preferably in the range 5-30%, and more preferably 5-15%, and the second rate is preferably in the range 0.5-10%, more preferably 0.5-5%, and more preferably still, 1%-3%.

All the embodiments of the anchor point are preferably employed in combination with a receptacle defining a hole, the hole having an opening. The opening is adapted to receive the first and second chocks therethrough and the hole is adapted to receive, into at least an entry portion thereof adjacent the opening, at least portions of the first and second chocks therein. However, a similar hole could be provided in the structure by alternative means.

Preferably the entry portion of the hole, however the hole may be provided, is tapered to progressively increase in lateral extent with increasing distance from the opening measured along an axis that is capable of being brought into alignment with the longitudinal axis.

Preferably, at least the entry portion of the hole is tapered relative to the longitudinal axis at a third rate, and the at least 50% of the radially outer-most surface of the second chock, when the second chock is seated against the first chock, is tapered relative to the longitudinal axis at a second rate, and the second rate is substantially the same as the third rate.

Preferably in all the embodiments of the anchor point in combination with a receptacle, the second and third rates are in the range 0.5-10%, more preferably 0.5-5%, and most preferably 1-3%.

A tool for use in the system is provided for installing or removing an anchor point from a hole. The tool includes a first grasping element, a second grasping element, a support member, and a torsion spring. The first grasping element has a "C" shaped structure defining a first opening and a first opening direction, and the second grasping element has a "C" shaped structure defining a second opening and a second opening direction. The first grasping element is pivotally supported by the support member so as to pivot about a longitudinal axis. The second grasping element is pivotally supported by the support member so as to pivot about the longitudinal axis. The first and second grasping elements are supported by the support member so that they are longitudinally spaced apart from one another a predetermined amount. The torsion spring is for spring biasing the first and second grasping elements angularly apart from one another.

Preferably, the support member is adapted to limit the angular spacing of the first and second opening directions to about 90 degrees.

The tool is provided for use with an anchor point which may be any anchor point having the following features including any of the anchor points described herein: an anchoring portion supporting a first chock, a locking/unlocking portion supporting at least one second chock, a cleaning bushing, and an elongate primary support member defining a longitudinal axis. The primary support member supports the anchoring portion, the locking/unlocking portion, and the cleaning bushing, so that the locking/unlocking portion is allowed, and also constrained, to move relative to the anchoring portion along the longitudinal axis in forward and backward directions, and so that the cleaning bushing is allowed, and also constrained, to move relative to the anchoring portion along the longitudinal axis in forward and backward directions independent of the locking/unlocking portion and so that the cleaning bushing is allowed to come into or out of abutting relationship with the anchoring portion over a range of relative movements of the locking/unlocking portion and the anchoring portion. The relationship between the first and second chocks is such that moving the locking/unlocking portion in the forward direction relative to the first chock results in the second chock being forced radially outwardly by the first chock to define, at an anchoring end of the anchoring portion, a wedging configuration of the anchor point. Also, moving the locking/unlocking portion in the backward direction relative to the first chock results in the second chock being allowed to move radially inwardly and thereby to define, at the anchoring end of the anchoring portion, a narrowed configuration of the anchor point. The cleaning bushing includes a first necked-down portion adapted to fit within the first opening while at least one of two adjacent portions of the attachment portion disposed, respectively, before and after the first necked-down portion along the longitudinal axis are too large to fit within the first opening. Also, the locking/unlocking portion includes a second necked-down portion adapted to fit within the second opening while at least one of two adjacent portions of the locking/unlocking portion disposed, respectively, before and after the second necked-down portion along the longitudinal axis is too large to fit within the second opening.

Preferably, both of the adjacent portions of the attachment portion are too large to fit within the first opening, and both of the adjacent portions of the locking/unlocking portion are too large to fit within the second opening.

The tool and anchor point are provided for use with a structure having a hole where, preferably, the hole has a constant taper. Preferably in that case, when the second chock is seated against the first chock, at least 50% of the radially outer-most surface of the second chock progressively increases in lateral extent in the forward direction at a rate that substantially matches the taper of the hole.

A receptacle for use in the system is also provided, preferably for embedding into a concrete structure that is ultimately formed by pouring concrete over a deck, for removably mounting an anchor point. The receptacle includes a receiving structure defining a receiving hole having an opening. The receiving hole is tapered to progressively increase in lateral extent with increasing distance from the opening measured along an axis that is capable of being brought into alignment with the longitudinal axis.

Preferably the receptacle includes a base having an aperture, the base for mounting to the deck such that the base aperture is aligned with a hole through the deck. The base is adapted for securably mounting the receiving structure thereto, such that the opening of the receiving hole is aligned with the base aperture.

A method for preparing a concrete structure for receiving an anchor point makes use of the system. The concrete structure has deck that is typically formed of metal or wood, and the deck is provided with a hole extending therethrough. The anchor point defines a longitudinal axis at an anchoring portion thereof. A hole is provided through the deck. A receiving structure is provided for receiving an anchoring portion of the anchor point. The receiving structure defines a receiving hole having an opening. The receiving hole is tapered to progressively increase in lateral extent with increasing distance from the opening measured along a receiving axis that is capable of being brought into alignment with the longitudinal axis, at least over an entry portion of the receiving hole adjacent the opening. The receiving structure is fixedly attached to the deck so that the opening is aligned with the hole through the deck. Preferably thereafter, concrete is poured over the deck.

Preferably, the method includes providing a base having a base aperture through the base, and fixedly attaching the base to the deck so that the base aperture is aligned with the hole through the deck, wherein the step of fixedly attaching includes fixedly attaching the receiving structure to the base so that the opening is aligned with the base aperture.

A method for installing an anchor point in a structure, or removing an anchor point from a structure, also makes use of the system. The anchor point includes an anchoring portion supporting a first chock, a locking/unlocking portion supporting at least one second chock, a cleaning bushing, and an elongate primary support member defining a longitudinal axis. The primary support member supports the anchoring portion, the locking/unlocking portion, and the cleaning bushing, so that the locking/unlocking portion is allowed, and also constrained, to move relative to the anchoring portion along the longitudinal axis in forward and backward directions, and so that the cleaning bushing is allowed, and also constrained, to move relative to the anchoring portion along the longitudinal axis in forward and backward directions independent of the locking/unlocking portion and so that the cleaning bushing is allowed to come into or out of abutting relationship with the anchoring portion over a range of relative movements of the locking/unlocking portion and the anchoring portion. The relationship between the first and second chocks is such that moving the locking/unlocking portion in the forward direction relative to the first chock results in the second chock being forced radially outwardly by the first chock to define, at an anchoring end of the anchoring portion, a wedging configuration of the anchor point. Also, moving the locking/unlocking portion in the backward direction relative to the first chock results in the second chock being allowed to move radially inwardly and thereby to define, at the anchoring end of the anchoring portion, a narrowed configuration of the anchor point. The method includes providing a tool including a first grasping element, a second grasping element, and a support member supporting the first and second grasping elements for rotation about a tool axis in a longitudinally spaced apart relation.

The first grasping element is caused to grasp the cleaning bushing at a first part thereof. The cleaning bushing is moved in the forward direction relative to the anchoring portion so as to cause the cleaning bushing to come into abutment therewith. The cleaning bushing is moved further in the forward direction relative to the anchoring portion against the first spring-bias so as to cause the cleaning bushing to exert a force on the anchoring portion and move the anchoring portion in the forward direction, thereby disposing the anchor point into the narrowed configuration. The second grasping element is caused to grasp the locking/unlocking portion at a second part thereof to maintain the anchor point in the narrowed configuration. The tool is moved so as either to insert the anchoring end of the anchor point into a hole in the structure or withdraw the anchoring end of the anchor point from the hole.

Preferably, the first part is a necked-down part of the cleaning bushing, the first grasping element has a "C" shaped structure defining a first opening and a first opening direction, the second part is a necked-down part of the locking/unlocking portion, and the second grasping element has a "C" shaped structure defining a second opening and a second opening direction. Preferably in such case the first grasping element grasps the cleaning bushing at least in part by receiving the first part into the first opening along the first opening direction, and the second grasping element grasps the locking/unlocking portion at least in part by receiving the second part into the second opening along the second opening direction.

Preferably the grasping elements are second spring-biased relative to each other so that the first and second opening directions are spaced angularly apart from one another, and preferably in that case the method further includes manipulating the tool to overcome the second spring-bias.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 1 is an isometric view of an anchor point according to the invention.

FIG. 2 is an exploded elevation view of the anchor point of FIG. 1.

FIG. 11 is an isometric view of the anchor point and tool of FIG. 10 in a further step toward removing the anchor point from the hole according to the invention.

DETAILED DESCRIPTION OF PREFERRED EMBODIMENTS

Figure 3:
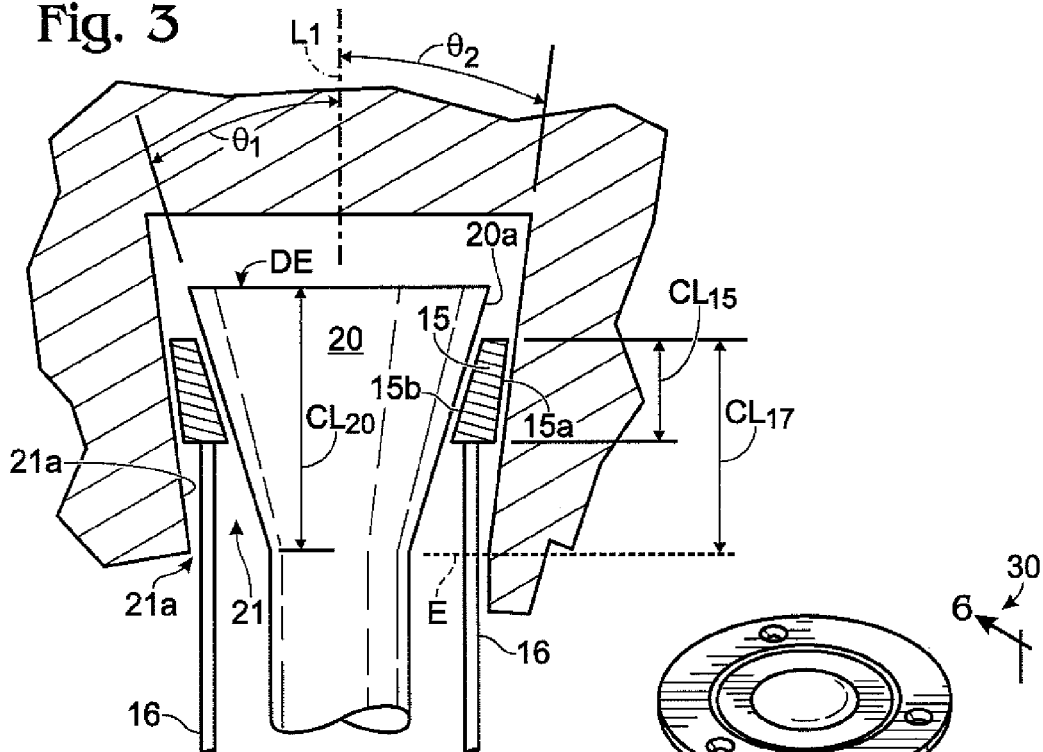
FIG. 3 is an elevation, cross-sectional view of part of an anchoring portion, and a corresponding part of a locking/unlocking portion, of the anchoring point of FIG. 1, installed in a hole.

A preferred concrete anchor point system according to the invention includes three separate components, a concrete anchor point, a receptacle for receiving the concrete anchor point, and a tool for remotely installing the concrete anchor point in the receptacle, or removing the concrete anchor point from the receptacle.

The concrete anchor point is a modification of prior art anchor points such as that described in U.S. Pat. No. 6,729,821 to Guthrie et al. It is particularly adapted for use in an overhead concrete structure such as a ceiling or beam that is part of a larger structure such as a building or bridge.

The present inventors have recognized that the concrete anchor point may be used to provide fall protection during remodeling or maintenance of an existing structure as well as in a new structure during construction, and that for the former purpose, it is desirable to incorporate a number of specialized receptacles for receiving the concrete anchor point in the structure as it is being constructed.

The present inventors have also developed a tool that facilitates a user to install or remove a concrete anchor point in or from the receptacles.

The three components are described separately below.

Anchor Point

FIGS. 1 and 2 show a preferred concrete anchor point 10 according to the invention. The concrete anchor point 10 could be used in any application in which an anchor point could be used, and so it will be referred to more generally as an anchor point.

With specific reference to FIG. 1, the anchor point 10 includes an attachment portion 10*a*, an anchoring portion 10*b*, and a locking/unlocking portion 10*c*. The attachment portion 10*a* is connected to the anchoring portion 10*b* by an elongate main support member 12. The main support member 12 supports the anchoring portion 10*b*. It may be rigid, but preferably it is flexible, meaning for purposes herein that it is able to bend elastically (i.e., without undergoing plastic deformation) through an angle of at least 45 degrees, and preferably at least 90 degrees, to allow the support member 12 to depart from a straight line, coincident with a longitudinal axis "$L_1$" of the anchor point 10.

That is, the primary support member 12 defines an elongate line that can be curved, and so will only be coincident with the longitudinal axis $L_1$ when the primary support member is in a relaxed (not bended) configuration. However the elongate line defined by the primary support member will always be coincident with the longitudinal axis $L_1$ as shown in FIGS. 1 and 2 at a distal-most end "DE" of the anchoring portion 10b, and this is the only place the orientation of the line matters. So for convenience the elongate line of the primary support member 12 will be assumed to be straight and coincident with the longitudinal axis $L_1$ for purposes of definition herein, even though it will be understood that the primary support member can bend.

The main support member 12 is preferably formed of twisted wire cable.

The main support member also slidably, coaxially supports the locking/unlocking portion 10c, so that the locking/unlocking portion is constrained to move relative to the anchoring portion 10b along the axis $L_1$ in forward and backward directions "FWD" and "BWD."

The anchoring portion 10b includes a main chock 20 that is centrally disposed about the axis $L_1$. The main chock is for insertion into a pre-existing hole in a concrete structure, for anchoring the concrete anchor point to the structure, as will be described more fully below.

The main chock 20 is preferably frustoconical, having a cone-shaped radially outer-most surface 20a, but it could have other shapes that progressively increase in at least one lateral dimension, i.e., a dimension measured perpendicular to the axis $L_1$, in the FWD direction. For example, the main chock 20 could be funnel shaped, or it could be wedge shaped. The reason for the progressively increasing lateral size will be made clear by the discussion to follow.

The locking/unlocking portion 10c includes a body 14 and at least one opposing chock 15 connected to the body portion by an associated elongate opposing chock support member 16. In the preferred embodiment shown there are two opposing chocks 15, and in the case where there are two or more opposing chocks, the opposing chocks are preferably radially symmetrically disposed about the main chock by the opposing chock support members.

The main chock 20 has a length "$CL_{20}$" measured parallel to the axis $L_1$, and the opposing chock(s) 15 has a corresponding length "$CL_{15}$." It is generally defined as being a safety requirement of an anchor point used for fall protection, by safety standards organizations in the United States and other countries (such as OSHA (Occupational Safety and Health Administration), EU-OSHA (European Agency for Safety and Health at Work), ANSI (American National Standards Institute), CSA (Canadian Standards Association), and CEN (European Committee for Standardization; particularly European Standard EN795)), that the anchor point be strong enough so that when anchored to a hole it can support a load, such as may be applied to the ring 18 of the anchor point 10, of about 5,000 pounds (or about 22 kN). Preferably, both the main and opposing chocks are formed of a strong metal such as steel, in which case the length $CL_{15}$ of the opposing chock(s) is preferably at least ⅜", more preferably ⅝"+/−⅛", and most preferably about ⅝". Also, regardless of the materials used for the main and opposing chock(s), the length $CL_{20}$ is preferably at least twice the length $CL_{15}$.

The chock support member(s) 16 support the opposing chocks 15 but are also able to bend elastically through an angle of at least 20 degrees, to allow the opposing chocks 15 to move radially relative to the axis $L_1$, i.e., closer to the axis or farther from the axis. The opposing chock support members 16 are also preferably formed of twisted wire cable.

The reason for providing a progressively increasing lateral dimension of the main chock 20 is so that sliding the locking/unlocking portion 10c in the forward direction FWD relative to the anchoring portion 10b results in the opposing chock(s) 15 being forced radially outwardly by the main chock 20. Conversely, sliding the locking/unlocking portion 10c in the backward direction BWD relative to the anchoring portion 10b results in the opposing chock(s) 15 being allowed to withdraw radially inwardly.

The main chock 20 and the opposing chock(s) 15 define an anchoring end of the anchoring portion for insertion into a hole. When the opposing chock(s) 15 are forced radially outwardly by the main chock 20, the anchoring end defines a wedging configuration of the anchor point in which the anchoring end is wedged against the sidewall of the hole. Conversely, when the opposing chock(s) 15 are allowed to withdraw radially inwardly, the anchoring end defines a narrowed configuration of the anchor in point in which the anchoring end is narrow enough that it can be either inserted into the hole or withdrawn from the hole.

More specifically, to attach the concrete anchoring point 10 to a concrete structure having a hole, or to remove an already attached concrete anchor point 10 from such a structure, a user grasps the attachment portion 10a, and draws the locking/unlocking portion 10c in the backward direction BWD relative thereto, which correspondingly draws the locking/unlocking portion backward relative to the anchoring portion 10b. This draws the opposing chocks 15 backwardly relative to the main chock 20 so the opposing chocks 15 are not forced radially outwardly so far apart from one another by the main chock 20. A point is reached in this progression where the opposing chocks 15 and main chock 20 together define an assembly that is narrow enough to be inserted into the hole or withdrawn therefrom.

Once the anchor point 10 has been inserted into the hole in its narrowed configuration, it may be caused to become wedged in the hole by pushing the locking/unlocking portion 10c away from the attachment portion 10a, and therefore away from the anchoring portion 10b, in the forward direction FWD toward the hole. This action causes the opposing chocks 15 to spread radially outwardly, farther apart from one another as they follow the progressively increasing diametric size of the main chock 20.

With the anchor point set in its wedging configuration, with the chocks 15 and 20 wedged in the hole, the anchor point is ready to support a load. The user will attach one end of a lanyard to a ring 18 of the attachment portion 10a, and attach him or herself to the other end of the lanyard, such as through a harness that the user is wearing. Pulling on the attachment portion 10a, such as would happen if the user falls, pulls the main chock 20 tighter against the opposing chocks 15, forcing them radially outwardly against the interior surface of the hole. Thus, the harder the user pulls on the attachment portion 10a, the more the anchor point resists, and the anchor point therefore remains anchored to the structure.

The present inventors have recognized that the degree of resistance the anchor point 10 provides to being pulled out of the hole once it has been installed therein is greatly facilitated by utilizing a tapered hole, as will be described in more detail below, even if the degree of taper is quite minimal. There is a qualitative difference between having zero taper and having a very small amount of taper, and increasing the taper beyond a small amount provides only limited or no benefit, and can reach a level at which is counterproductive.

Referring to FIG. 3, the anchoring end 20 of the anchoring portion 10b is shown installed in a hole 21, with the chocks 15 also being inserted into the hole. The hole 21 has an opening 21a indicated at the elevation "E," and a frustoconical inside surface 21a of the hole defining an entry portion of the hole commencing at the opening and extending deeper into the hole, so that the hole is tapered over a working depth thereof extending from the opening above the elevation E.

The main chock 20 has a frustoconical outer surface 20a, and the chocks have respective outside and inside surfaces 15a and 15b. The surfaces 15a and 21a preferably define, in cross-sections thereof that contain the axis $L_1$, an equal angle $\theta_1$ relative to the axis $L_1$, which defines in this case the taper of the hole. Similarly, the surfaces 15b and 20a preferably define, in the same cross-sections, an equal angle $\theta_2$ relative to the axis $L_1$, which is the angle defined by the end 20. Preferably, $\theta_1$ is in the range 5-30%, and more preferably it is in the range 5-15%. Preferably, $\theta_2$ is in the range of 0.5-10%, more preferably 0.5-5%, and more preferably still 1%-3%. As the choice of units of percentage suggest, the angles $\theta_1$ and $\theta_2$ may be thought of as rates of increase of the lateral dimensions defined by the respective surfaces.

The angle $\theta_1$ defines a constant rate of dimensional increase, or a constant taper, but it should be understood that the surfaces 15a and 21a may have rates of increase, or rates of taper, that while progressively increasing in lateral extent (i.e., perpendicular to the longitudinal axis) in the forward direction, do so at variable rates. For example, the surface 24b has a minimum lateral dimension "M" (FIG. 1), and progressively increases in lateral extent in the forward direction FWD from there at an ever increasing rate. This corresponds to an angle $\theta$ (either $\theta_1$ or $\theta_2$) that, measured as the tangent of the surface, increases in the forward direction. It is also possible that the rates of taper of the surfaces 15a and 21a, specified at any given plane perpendicular to the longitudinal axis, are not equal, and this may be true whether either or both tapers are constant or variable. The same considerations apply for the angle $\theta_2$ and the surfaces 15b and 20a.

It should be understood that the configuration of the hole beyond the aforementioned working depth is unimportant, e.g., at depths that exceed the penetration depth of the anchor point 10 into the hole.

The penetration depth of the anchor point 10 depends on the aforementioned lengths "CL" of the main and opposing chocks, and on where the opposing chock(s) 15 seats on the main chock 20 when the anchor point is installed in a hole. In FIG. 3, the main chock 20 has a length $CL_{20}$, and it is shown so that it also penetrates the hole 21 by the same amount. But this degree of penetration is somewhat arbitrary. The depth of penetration of the main chock 20, measured by the amount the distal-most end DE extends above the elevation line E, could be either less than or greater than the dimension $CL_{20}$.

The penetration depth for the opposing chock(s) 15 also measured from the elevation E is indicated in FIG. 3 as "$CL_{17}$," which is preferably equal to the $CL_{15}$ dimension discussed previously plus at least 1/8", to ensure that the entirety of the opposing chock(s) 15 is inside the hole 21; however, this is not essential either.

It should also be understood that the working depth is established by the areas of the main chock 20 and opposing chock(s) 15 that are tapered as provided herein, because it is the tapered surfaces, particularly where they are in contact with one another, that provide the desired function.

It should be further understood that portions of the main and opposing chock(s), as well as for that of the hole 21, can deviate from being tapered as described herein, so long as that will not defeat the functionality of the tapered surfaces. Thus it is not essential for the entireties of the surfaces 15a, 15b, and 20a to be tapered as described herein. It is not practical to specify precisely all the different possibilities for allowing parts of these surfaces deviate from being tapered as described herein, but as a convenient general rule it will be taken for purposes herein that at least 50% of these surfaces, and preferably at least 80% of these surfaces, defined by areas thereof measured parallel to the axis $L_1$, should be tapered as described herein.

Turning back to FIG. 2, a compression spring 22 is preferably provided, seated at a proximal end thereof on a collar 23 that may be clamped or swaged onto the primary support member 12. The spring 22 is seated at a distal end thereof against a proximal end 24 of the body 14 of the locking/unlocking portion 10c. The spring 22 spring-biases the locking/unlocking portion 10c in the forward direction FWD, relative to the anchoring portion 10b; that is, the spring 22 spring-biases the concrete anchor point 10 into the wedging configuration. Therefore, to install the concrete anchor point, the user must overcome the bias of the spring 22. This is conveniently done by the user extending a thumb through the ring 18 of the attachment portion 10a, grasping respective opposite sides of a necked-down outer surface 24b of the locking/unlocking portion 10c between the forefinger and the middle finger, and squeezing the two fingers and thumb together.

Such a spring is typically provided in anchor points such as that described in U.S. Pat. No. 6,729,821. However, it should be noted that tapering the hole and conforming the opposing chocks accordingly diminishes the need for use of such a spring, and may eliminate it entirely, insofar as the spring serves the traditionally understood purpose of assisting in the wedging action provided by an anchor point. On the other hand, the spring 22 greatly facilitates use of a tool for remotely installing or removing the concrete anchor point as will be described below.

For this latter purpose as well, a cleaning bushing 25 is provided that, like the locking/unlocking portion 10e, is also slidably supported along the main support member 12, constrained to move in the FWD and BWD directions along the axis $L_1$. The cleaning bushing 25 has an end portion 25a having a diameter 25D. The diameter 25D is small enough that the end portion 25a will fit inside the proximal end 24 of the body 14 of the locking/unlocking portion 10c, so that a distal end $25a_1$ of the end portion 25a may contact a proximal end 19 (FIG. 2) of the anchoring portion 10b.

The cleaning bushing 25 also has an enlarged head portion 25b, and a necked-down surface 25c the purpose of which will be explained below in connection with the description of the remote installation and removal tool.

The anchor point 10 will typically be installed so that the axis $L_1$ is vertical, with the anchoring portion 10b facing up and the attachment portion 10a facing down. The cleaning bushing 25 is thus normally disposed as shown in FIG. 1, resting on the attachment ring 18, with the end $25a_1$ spaced far from the end 19 of the anchoring portion 10b. To use the cleaning bushing 25 with the anchor point oriented in this manner, the user may slide it upwardly until the end $25a_1$ contacts the end 19, and use the head portion 25b to further push it forward in the direction FWD, so as to compress the spring 22 and overcome the bias toward the wedging configuration.

Then, the enlarged head portion 25b that can be struck with a tool, such as by resting a punch thereon and striking the punch with a hammer, for the purpose of loosening the anchoring portion 10b relative to the locking/unlocking portion 10c, so that the anchor point can be withdrawn from the structure.

A feature of the body 14 of the locking/unlocking portion 10c may also be noted. The body 14 has a proximal end 24 having an inside surface 24a (FIG. 1), which is curved substantially the same as the necked-down outer surface 24b (FIG. 2). When the primary support member 12 bends sufficiently to contact the inside surface 24a, the force is distributed over the curved surface 24a to reduce stress concentration on the primary support member.

The ring 18 is preferably adapted to swivel about the axis $L_1$, relative to both the anchoring portion 10b and the locking/unlocking portion 10c, to help prevent the lanyard from twisting. This adaptation is best made particularly where the ring 18 is attached to the primary support member 12.

Receptacle

Figure 4:
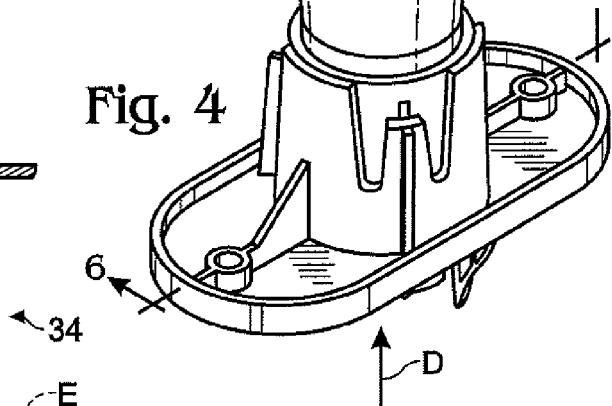
FIG. 4 is an isometric view of a receptacle for the anchor point of FIG. 1 according to the invention.
Figure 6:
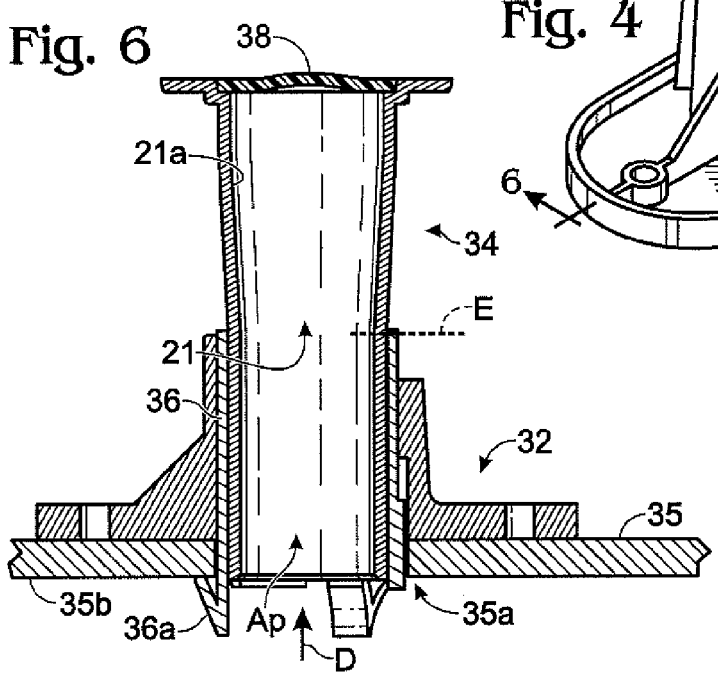
FIG. 6 is a cross-sectional view of the receptacle of FIG. 4, taken along a line 6-6 thereof.
Figure 5:
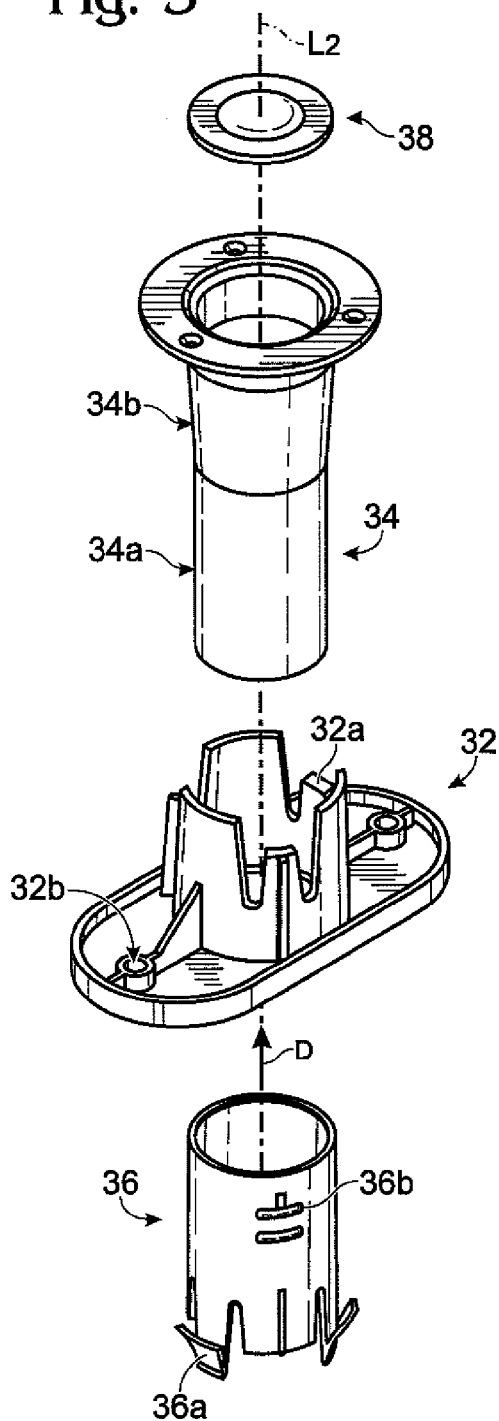
FIG. 5 is an exploded isometric view of the receptacle of FIG. 4.

FIGS. 4-6 show a preferred receptacle 30 according to the invention, for receiving the anchor point 10, particularly those parts of the anchor point 10 shown inserted into the hole 21 in FIG. 3. The receptacle 30 is for mounting to a deck. The deck is typically formed of sheet metal or plywood, and is used as a support on which concrete is poured after the receptacle is placed into position. The receptacle 30 is particularly adapted for mounting to a sheet metal deck.

FIG. 4 shows the receptacle 30 assembled, where in an overhead application the direction "D" would be "up." The receptacle 30 would receive an anchor point 10 that is being installed from the direction D.

FIG. 5 shows the component parts of FIG. 4 exploded along a receptacle axis "$L_2$" that is coincident with the aforementioned axis $L_1$ when the anchor point 10 is joined to the receptacle 30. The only essential component is 34, an anchoring portion receiving structure; however, there is also preferably a base 32 and an anchoring ferrule 36 for anchoring the base to the deck.

The base internally defines an aperture "$A_P$" (FIG. 6). The aperture $A_P$ has a substantially constant cross-sectional size and shape in planes perpendicular to the axis $L_1$, preferably circular.

Referring to FIG. 6, the anchoring portion receiving structure 34 also defines a hole 21, concentric with and accessible through the aperture $A_P$. This is essentially the same hole discussed in connection with FIG. 3. The hole has an opening 21a, and is tapered as described above over at least an entry portion thereof (extending above the elevation E) that is adjacent the opening. Preferably, the hole is tapered over a distance measured parallel to the aforedescribed lengths $CL_{15}$ and $CL_{20}$ that is at least twice the length $CL_{15}$, and preferably equal to, and more preferably greater than, the length $CL_{20}$.

The receptacle 30 also in the preferred embodiment has a cap 38 for capping the hole 21, to prevent concrete from spilling into the hole when the concrete is poured.

The purpose of the receptacle 30 is to provide the hole 21, which as shown more clearly in FIG. 3 has tapered sides, which could not be achieved in the concrete structure simply by drilling.

FIG. 6 shows how the components fit together, and their relationship to a deck 35. The ferrule 36 is a hollow cylinder with projecting barbs 36a that allow for one-way insertion of the anchoring ferrule 36 through a pre-drilled hole 35a in the deck 35 in the direction opposite to the direction D, the barbs 36a locking the ferrule to the underside 35b of the deck 35 so that the ferrule cannot be pushed back up in the direction D.

The ferrule preferably has a "gear rack" structure for cooperating with a corresponding "ratchet" structure in the base, of the type commonly provided in cable ties, to provide for cinching the ferrule tightly to the base. With reference to FIG. 5, the ferrule may alternatively or in addition have slots 36b for receiving tabs 32a of the base to lock the base and ferrule together.

As shown in FIG. 6, the anchoring portion receiving structure 34 fits within the anchoring ferrule 36. In the preferred embodiment, the former is adhesively bonded to the latter, but the two parts may be attached and locked together by any known means.

The base 32 has through-holes 32b for receiving threaded fasteners for attaching the base to the deck, so the anchoring ferrule 36 is only provided for the purpose of temporarily installing the base to the deck, as preparation for a separate, subsequent operation where the base is more permanently installed to the deck by the use of threaded fasteners. It is anticipated that there may be hundreds or even thousands of the receptacles installed in a structure, in which case it is desirable to implement such a two-stage installation procedure.

Figure 7:
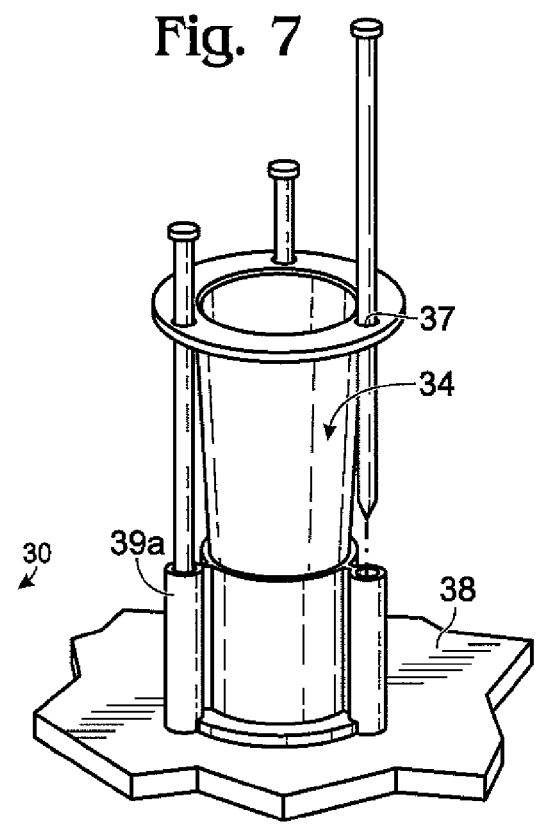
FIG. 7 is an isometric view of an alternative receptacle for the anchor point of FIG. 1 according to the invention.

FIG. 7 shows the anchoring portion receiving structure 34 attached to an alternative base 38 for use with a plywood deck. The base 38 has no anchoring ferrule. Instead, long nails 39 are inserted through holes 37 in the anchoring portion receiving structure 34, the nails extending through corresponding tubes 39a in the base 38, and the nails are hammered into the deck.

Instead of using a base, the anchoring portion receiving structure 34 could be mounted directly to a deck, such as by providing the through holes 32b or tubes 39a through a flange that is an integral part of the structure 34, or by providing external self-tapping screw threads at the end of the structure 34 for tapping into the hole provided through the deck.

Remote Concrete Anchor Point Installation and Removal Tool

Figure 8:
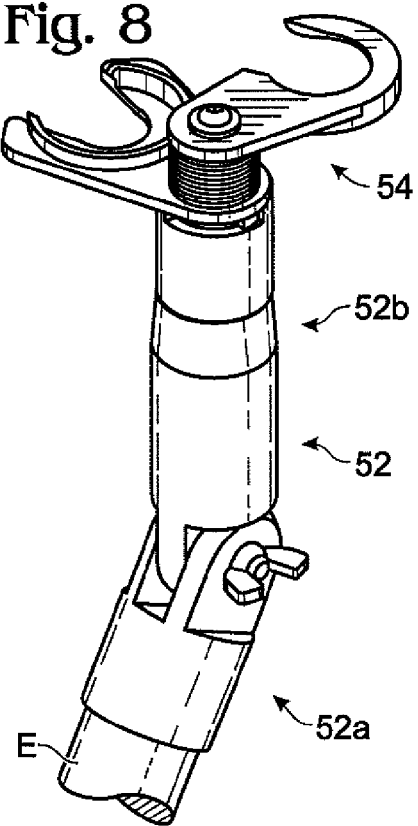
FIG. 8 is an isometric view of a tool for installing or removing the anchor point of FIG. 1 into or from a hole according to the invention.
Figure 9:
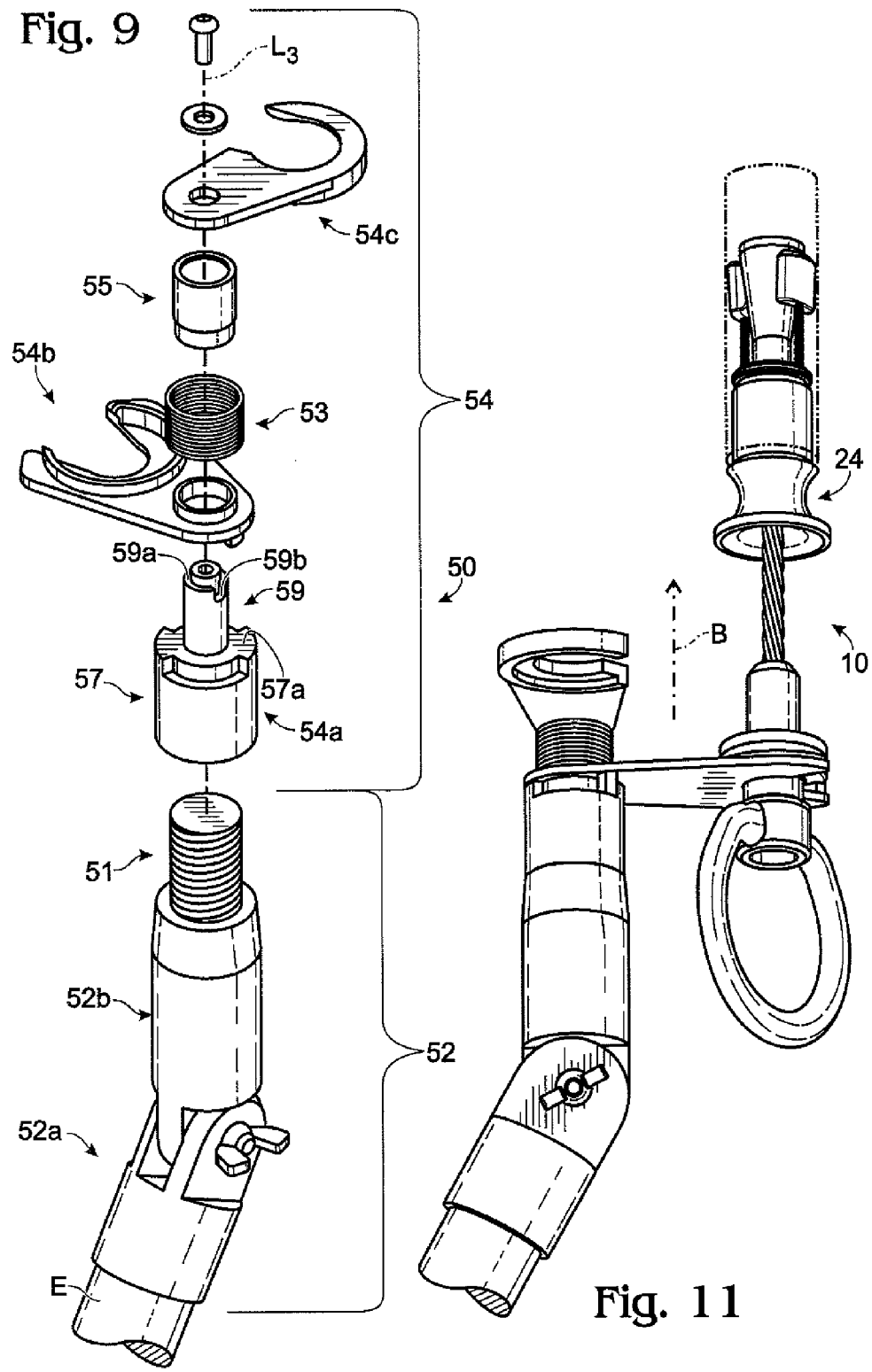
FIG. 9 is an exploded isometric view of the tool of FIG. 8.

FIGS. 8-11 show a preferred concrete anchor point installation and removal tool 50 according to the invention. FIG. 8 shows the tool fully assembled, and FIG. 9 shows the tool with two major components exploded along a tool axis "$L_3$," a pole attachment portion 52 and a working portion 54 for releasably connecting to the concrete anchor point.

A swivel portion 52a of the pole attachment portion 52 is adapted to internally receive the threaded end "E" of a painter's pole, such as the "Workforce 12 ft. Adjustable Extension Painter's Pole" marketed by The Home Depot of Atlanta Ga. The swivel portion 52a is attached to a head portion 52b with a wing-nut that allows for adjusting the angle of the pole relative to the head portion. The head portion 52b has a threaded end 51 for mating with the working portion 54.

The working portion 54 has a body portion 54a, a concrete anchor point attachment portion grip 54b, a coiled, torsion spring 53, a spacer 55, and a concrete anchor point locking/unlocking portion grip 54c.

The body portion 54a has a proximal end 57 with internal threads for receiving the aforementioned end 51.

The end 57 also provides a ledge 57a for supporting the concrete anchor point attachment portion grip 54b. A distal end 59 of the body portion 54a includes a ledge 59a for supporting the concrete anchor point locking/unlocking portion grip 54c, and standing the same off from the ledge 57a. The stand-off space so defined is provided to coaxially receive the coiled spring 53 together with the spacer 55, with the spacer 55 ensuring that the concrete anchor point attachment portion grip 54b remains spaced apart, along the axis $L_3$, from the concrete anchor point anchoring portion grip 54c, a predetermined amount.

The ledge 59a of the end 57 of the body portion 54a is adapted (see the cut-out 59b) to lock the angular position of the concrete anchor point attachment portion grip 54b, while the coiled, torsion spring 53 biases the concrete anchor point locking/unlocking portion grip 54c so that it extends at an angular position 90 degrees away. As shown, each of the two grip portions 54b (the anchor point attachment portion grip) and 54c (the anchor point locking/unlocking portion grip) has an essentially "U" or "C" (hereinafter "C") shaped structure for coupling to and decoupling from the anchor point 10, particularly and respectively the neck-down surface 25c of the cleaning bushing 25 and the necked-down outer surface 24b of the locking/unlocking portion 10c as shown in FIGS. 10-13.

Figure 10:
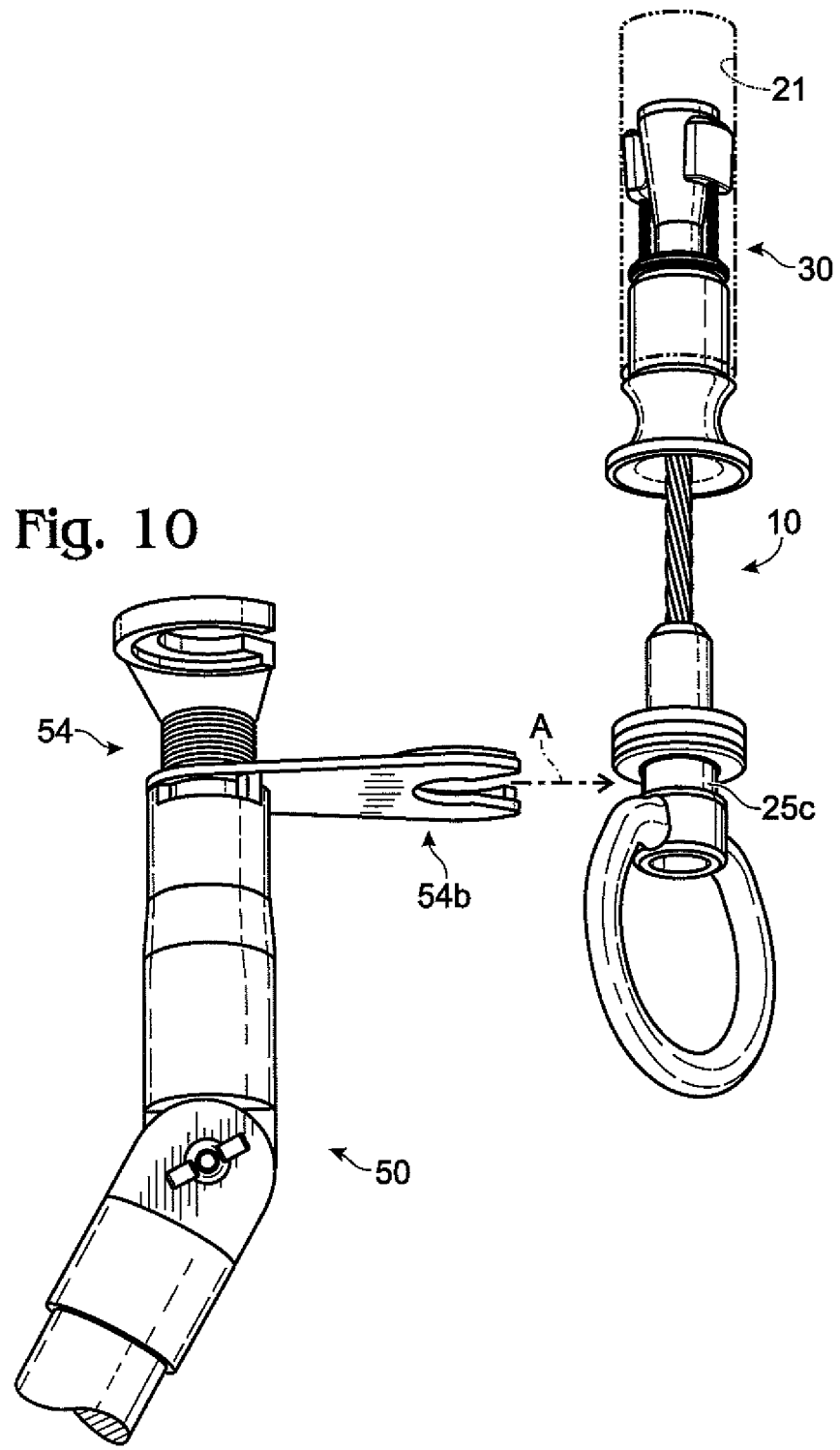
FIG. 10 is an isometric view of the anchor point of FIG. 1 installed in a hole, and the tool of FIG. 8 brought into proximity therewith as a first step toward removing the anchor point from the hole according to the invention.

FIG. 10 shows the anchor point 10 installed in a hole 21, particularly, the anchoring end of the anchoring portion 10b, and the tool 50 which is preferably manipulated by a user by use of the aforementioned painter's pole. The hole 21 is preferably provided by the receptacle 30 (shown schematically), though it should be understood that use of the tool 50 does not require use of the receptacle 30.

As a first step toward removing the anchor point 10 from the hole 21, the anchor point attachment portion grip 54b of the working portion 54 of the tool is first caused to move in the direction "A" toward the necked-down surface 25c of the cleaning bushing 25 of the anchor point, until the "C" shaped end thereof captures the surface 25 as shown in FIG. 11.

Figure 12:
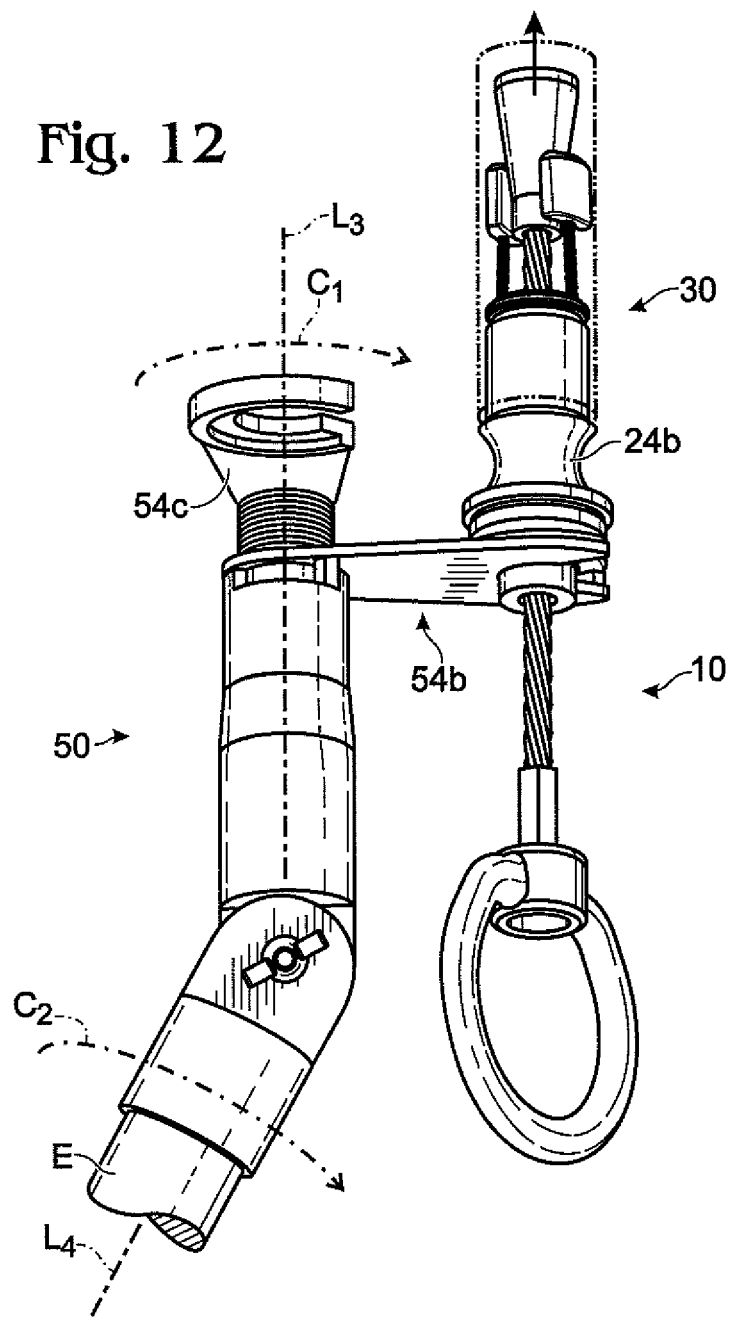
FIG. 12 is an isometric view of the anchor point and tool of FIGS. 10-11 in a still further step toward removing the anchor point from the hole according to the invention.

With reference to FIG. 11, after the cleaning bushing 25 has been captured by the tool, the tool is moved in the direction "B," which carries the bushing 25 along with it, toward the proximal end 24 of the body 14 of the locking/unlocking portion 10c until the configuration shown in FIG. 12 is reached. Referring briefly back to FIG. 2, in the configuration of FIG. 12, the distal end $25a_1$ of the end portion 25a of the cleaning bushing 25 has been brought into contact with the proximal end 19 of the anchoring portion 10b of the anchor point 10 (these details are not visible in FIG. 12).

The tool 50 is caused to continue moving in the direction B against the spring-bias provided by the spring 22 (see FIG. 2), which overcomes the wedging configuration of the anchor point and allows the anchor point to adopt its narrowed configuration so that the anchoring portion 10b is ready to be removed from the hole.

Then, the tool 50 is manipulated to cause the anchor point locking/unlocking portion grip 54c to rotate substantially in the direction "$C_1$." If the axis of the painter's pole "$L_4$" is angled relative to the axis $L_3$ of the tool such as shown, achieving this motion will generally call for some additional movement beyond rotating the pole in the direction "$C_2$" as can be readily appreciated.

Figure 13:
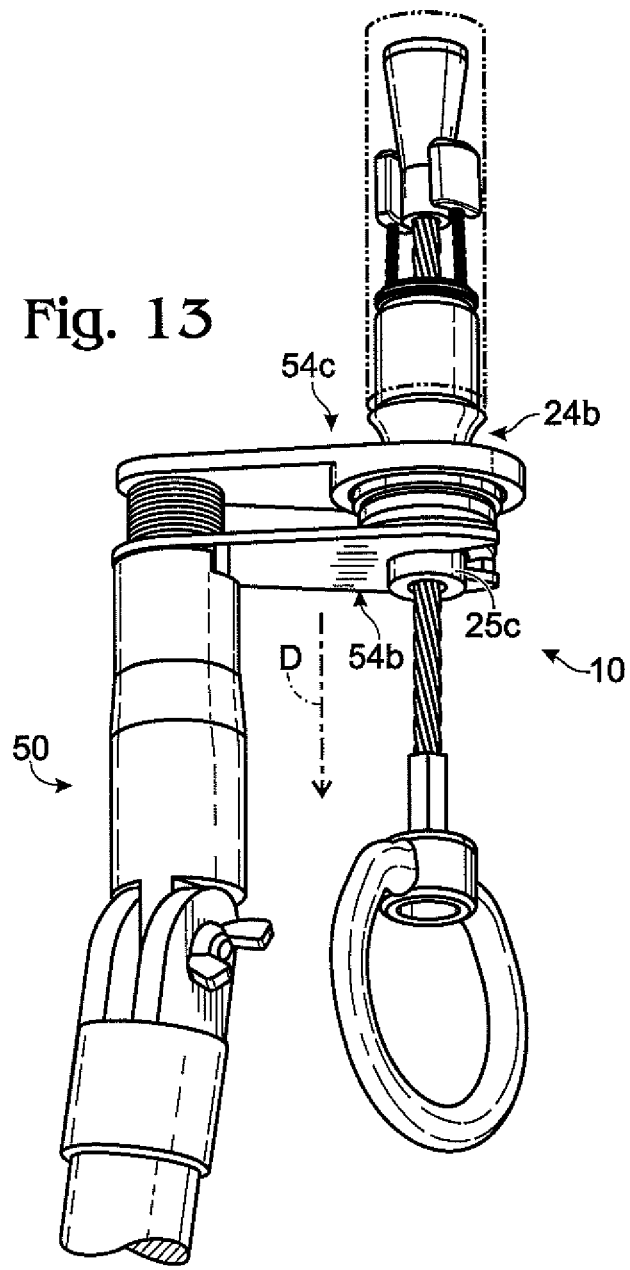
FIG. 13 is an isometric view of the anchor point and tool of FIGS. 10-12 in a yet further step toward removing the anchor point from the hole according to the invention.

The $C_1$ rotation is continued until the "C" shaped end of the locking/unlocking portion grip 54c captures the necked-down outer surface 24b of the locking/unlocking portion 10c of the anchor point 10 as shown in FIG. 13. The anchor point 10 is now maintained in its narrowed configuration by the tool 50, the spring-bias being exerted by the spring 22 being held off by the tool rather than by the user.

Figure 14:
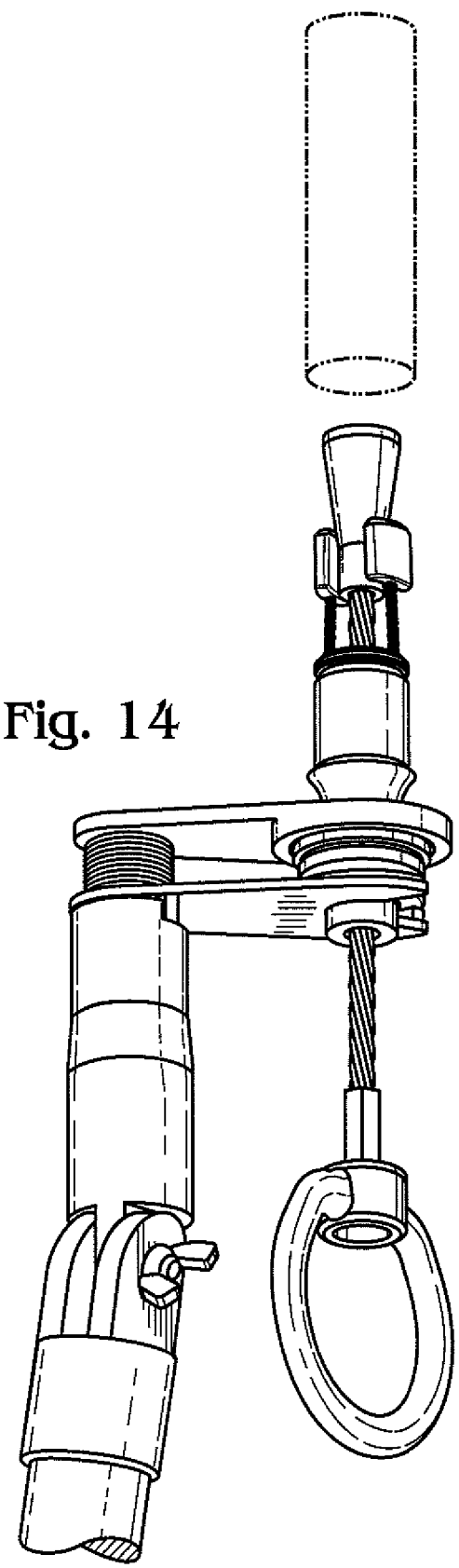
FIG. 14 is an isometric view of the anchor point and tool of FIGS. 10-13 showing the anchor point having been removed from the hole.

With reference to FIG. 13, after both the cleaning bushing 25 (at the surface 25c) and the locking/unlocking portion 10c (at the surface 24b) have been captured by the tool, the tool is caused to move in the direction "D," which pulls the anchor point out of the hole 21, with the result shown in FIG. 14.

To install the anchor point 10 the user may place it in the narrowed configuration without use of the tool, and attach the grips 54b and 54c as shown in FIG. 13 in any order, or substantially simultaneously. The tool may then be used to insert the anchor point into the hole 21, particularly, the anchoring end of the anchoring portion 10b.

The user then causes the tool to move in the opposite of the direction "D" to relieve the grips 54b and 54c from the spring-bias exerted by the spring 22, so that the tool can be manipulated as described above in connection with FIGS. 11 and 12 in reverse order to decouple the tool from the anchor point.

It is to be understood that, while a specific concrete anchor point system has been shown and described as preferred, other configurations could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An anchoring system for providing fall protection by supporting a rated load, comprising:
a structure having a hole therein; and
an anchor point for removably attaching to the structure through the hole, the anchor point comprising an anchoring portion supporting a first chock, a locking/unlocking portion supporting at least one second chock, and an elongate primary support member defining an elongate axis supporting said anchoring portion and said locking/unlocking portion so that said locking/unlocking portion is allowed, and also constrained, to move relative to said anchoring portion along the elongate axis in forward and backward directions along the elongate axis, wherein moving said locking/unlocking portion in the forward direction relative to said first chock results in said second chock being forced radially outwardly by said first chock to define a wedging configuration of the anchor point allowing for wedging said first and second chocks in the hole, wherein moving the locking/unlocking portion in the backward direction relative to said first chock results in said second chock moving radially inwardly to define a narrowed configuration of the anchor point allowing for removing the anchor point from the hole, wherein the hole defines a frustoconical surface of the structure, and wherein, with the anchor point inserted into the hole in the direction along which the hole increases in diameter and set in said wedging configuration so as to be ready to support the rated load, at least 50% of the radially outermost surface of said second chock that lies within the depth of penetration conforms to said surface.

2. The anchoring system of claim 1, further comprising a cleaning bushing, said primary support member supporting said cleaning bushing so that said cleaning bushing is allowed, and also constrained, to move relative to said anchoring portion along the longitudinal axis in the forward and backward directions independent of said locking/unlocking portion and so that said cleaning bushing is allowed to come into or out of abutting relationship with said anchoring portion over a range of relative movements of said locking/unlocking portion and said anchoring portion.

3. The anchoring system of claim 1, wherein at least 50% of the radially outer-most surface of said first chock is tapered relative to the elongate axis at a first rate, wherein, when said second chock is seated against said first chock, said at least 50% of the radially outer-most surface of said second chock is tapered relative to the axis at a second rate, and wherein said first rate is greater than said second rate.

4. The anchoring system of claim 3, wherein said hole is provided in a receptacle attached to the structure.

5. The anchoring system of claim 1, wherein said hole is provided in a receptacle attached to the structure.

6. The anchoring system of claim 2, comprising wherein the at least one second chock comprises at least two second chocks, such that the at least two second chocks are symmetrically disposed about the longitudinal axis.

7. The anchoring system of claim 2, wherein at least 50% of the radially outer-most surface of said first chock is tapered relative to the elongate axis at a first rate, wherein, when said second chock is seated against said first chock, said at least 50% of the radially outer-most surface of said second chock is tapered relative to the axis at a second rate, and wherein said first rate is greater than said second rate.

8. The anchoring system of claim 6, wherein at least 50% of the radially outer-most surface of said first chock is tapered relative to the elongate axis at a first rate, wherein, when said second chock is seated against said first chock, said at least 50% of the radially outer-most surface of said second chock is tapered relative to the axis at a second rate, and wherein said first rate is greater than said second rate.

9. The anchoring system of claim 8, wherein said hole is provided in a receptacle attached to the structure.

10. The anchoring system of claim 7, wherein said hole is provided in a receptacle attached to the structure.

11. The anchoring system of claim 6, wherein said hole is provided in a receptacle attached to the structure.

12. The anchoring system of claim 2, wherein said hole is provided in a receptacle attached to the structure.

13. A tool for installing or removing an anchor point from a hole, comprising:
a first grasping element having a "C" shaped structure defining a first opening for grasping a first part of the anchor point;
a second grasping element having a "C" shaped structure defining a second opening for grasping a second part of the anchor point;
an elongate support member defining a longitudinal axis, said first and second grasping elements each being pivotally supported by said support member so that they are longitudinally spaced apart from one another a predetermined amount and extend from said support member in radial directions relative to the longitudinal axis, said support member adapted to allow for radially angularly displacing one of said grasping elements relative to the other of said grasping elements about the longitudinal axis, said first and second grasping element further adapted so that a radially angular displacement of one of said grasping elements relative to the other of said grasping elements about the longitudinal axis produces a corresponding linear displacement of the respective said openings, wherein increasing amounts of said radially angular displacement correspond to increased distance between said openings; and
a spring for spring biasing said first and second grasping elements such that the first and second grasping elements are spaced from one another along the support member toward increasing amounts of said radially angular displacement.

14. The tool of claim 13, wherein said support member is adapted to allow for said radially angular displacement up to about 90 degrees.

15. The tool of claim 13, in combination with an anchor point, the anchor point comprising an anchoring portion supporting a first chock, a locking/unlocking portion supporting at least one second chock, a cleaning bushing, and an elongate primary support member defining a longitudinal axis, said primary support member supporting said anchoring portion, said locking/unlocking portion, and said cleaning bushing, so that said locking/unlocking portion is allowed, and also constrained, to move relative to said anchoring portion along the longitudinal axis in forward and backward directions, and so that said cleaning bushing is allowed, and also constrained, to move relative to said anchoring portion along the longitudinal axis in forward and backward directions independent of said locking/unlocking portion and so that said cleaning bushing is allowed to come into or out of abutting relationship with said anchoring portion over a range of relative movements of said locking/unlocking portion and said anchoring portion, the relationship between said first and second chocks being such that moving said locking/unlocking portion in the forward direction relative to said first chock results in said second chock being forced radially outwardly by said first chock to define, at an anchoring end of said anchoring portion, a wedging configuration of the anchor point, and such that moving the locking/unlocking portion in the backward direction relative to said first chock results in said second chock being allowed to move radially inwardly and thereby to define, at said anchoring end of said anchoring portion, a narrowed configuration of the anchor point, wherein said cleaning bushing includes a first necked-down portion adapted to fit within said first opening while at least one of two adjacent portions of said cleaning bushing portion disposed, respectively, before and after said first necked-down portion along the longitudinal axis is too large to fit within said first opening, and wherein said locking/unlocking portion includes a second necked-down portion adapted to fit within said second opening while at least one of two adjacent portions of said locking/unlocking portion disposed, respectively, before and after said second necked-down portion along the longitudinal axis is too large to fit within said second opening.

16. The tool and anchor point of claim 15, wherein both of said adjacent portions of said attachment portion are too large to fit within said first opening, and wherein both of said adjacent portions of said locking/unlocking portion are too large to fit within said second opening.

17. The tool and anchor point of claim 16 in combination with a structure having a hole with a constant taper, wherein, when said second chock is seated against said first chock, at least 50% of the radially outer-most surface of said second chock progressively increases in lateral extent in the forward direction at a rate that substantially matches the taper of said hole.

18. The tool and anchor point of claim 15 in combination with a structure having a hole with a constant taper, wherein, when said second chock is seated against said first chock, at least 50% of the radially outer-most surface of said second chock progressively increases in lateral extent in the forward direction at a rate that substantially matches the taper of said hole.

19. A method for installing an anchor point in a structure, or removing an anchor point from a structure, the anchor point including an anchoring portion supporting a first chock, a locking/unlocking portion supporting at least one second chock, a cleaning bushing, and an elongate primary support member defining a longitudinal axis, said primary support member supporting said anchoring portion, said locking/unlocking portion, and said cleaning bushing, so that said locking/unlocking portion is allowed, and also constrained, to move relative to said anchoring portion along the longitudinal axis in forward and backward directions, and so that said cleaning bushing is allowed, and also constrained, to move relative to said anchoring portion along the longitudinal axis in forward and backward directions independent of said locking/unlocking portion and so that said cleaning bushing is allowed to come into or out of abutting relationship with said anchoring portion over a range of relative movements of said locking/unlocking portion and said anchoring portion, the relationship between said first and second chocks being such that moving said locking/unlocking portion in the forward direction relative to said first chock results in said second chock being forced radially outwardly by said first chock to define, at an anchoring end of said anchoring portion, a wedging configuration of the anchor point, and such that moving the locking/unlocking portion in the backward direction relative to said first chock results in said second chock being allowed to move radially inwardly and thereby to define, at said anchoring end of said anchoring portion, a narrowed configuration of the anchor point, the method comprising providing a tool including a first grasping element, a second grasping element, and a support member supporting said first and second grasping elements for rotation about a tool axis in a longitudinally spaced apart relation, causing said first grasping element to grasp said cleaning bushing at a first part thereof, moving said cleaning bushing in the forward direction relative to said anchoring portion so as to cause said cleaning bushing to come into abutment therewith, continuing to move said cleaning bushing in the forward direction relative to the anchoring portion against a spring-bias so as to cause said cleaning bushing to exert a force on said anchoring portion and move said anchoring portion in the forward direction, thereby disposing said anchor point into the narrowed configuration, causing said second grasping element to grasp the locking/unlocking portion at a second part thereof to maintain said anchor point in the narrowed configuration, and moving said tool so as either to insert said anchoring end of said anchor point into a hole in the structure or withdraw said anchoring end of said anchor point from the hole.

20. The method of claim 19, wherein the first part is a necked-down part of the cleaning bushing, wherein the first grasping element has a "C" shaped structure defining a first opening and a first opening direction, wherein the second part is a necked-down part of the locking/unlocking portion, wherein the second grasping element has a "C" shaped structure defining a second opening and a second opening direction, wherein causing the first grasping element to grasp the cleaning bushing includes receiving the first part into the first opening along the first opening direction, and wherein causing the second grasping element to grasp the locking/unlocking portion includes receiving the second part into the second opening along the second opening direction.

21. The method of claim 20, further comprising spring-biasing the grasping elements angularly apart from one another, and manipulating the tool to overcome said spring-biasing.

* * * * *